(12) United States Patent
Caruel et al.

(10) Patent No.: US 10,605,196 B2
(45) Date of Patent: Mar. 31, 2020

(54) DOOR-TYPE THRUST REVERSER DEVICE FOR AIRCRAFT TURBOJET ENGINE NACELLE

(71) Applicant: AIRCELLE, Gonfreville l'Orcher (FR)

(72) Inventors: Pierre Caruel, Le Havre (FR); Thiery Le Docte, Le Havre (FR)

(73) Assignee: AIRCELLE, Gonfreville l'Orcher (FR)

( * ) Notice: Subject to any disclaimer, the term of this patent is extended or adjusted under 35 U.S.C. 154(b) by 479 days.

(21) Appl. No.: 15/286,955

(22) Filed: Oct. 6, 2016

(65) Prior Publication Data

US 2017/0022934 A1 Jan. 26, 2017

Related U.S. Application Data

(63) Continuation of application No. PCT/FR2015/050733, filed on Mar. 24, 2015.

(30) Foreign Application Priority Data

Apr. 8, 2014 (FR) ...................... 14 53106

(51) Int. Cl.
*F02K 1/60* (2006.01)
*F02K 1/82* (2006.01)
(Continued)

(52) U.S. Cl.
CPC .................. *F02K 1/60* (2013.01); *F02K 1/70* (2013.01); *F02K 1/766* (2013.01); *F02K 1/822* (2013.01);
(Continued)

(58) Field of Classification Search
CPC ... F02K 1/60; F02K 1/605; F02K 1/62; F02K 1/625; F02K 1/70; F02K 1/72;
(Continued)

(56) References Cited

U.S. PATENT DOCUMENTS 3,920,203 A * 11/1975 Moorehead ............. B64C 21/04
244/110 B
4,000,612 A 1/1977 Wakeman et al.
(Continued)

FOREIGN PATENT DOCUMENTS

EP 0632196 1/1995
EP 1327767 7/2003

OTHER PUBLICATIONS

International Search Report for International Application PCT/FR2015/050733, dated Jul. 7, 2015.

*Primary Examiner* — Andrew H Nguyen
(74) *Attorney, Agent, or Firm* — Burris Law, PLLC

(57) ABSTRACT

A door-type thrust reverser device for a turbojet engine nacelle is provided that includes a fixed structure, a mobile structure mobile with respect to said fixed structure, and at least one door mounted with the ability to pivot via pivots between a retracted position corresponding to the nacelle operating in direct-jet mode, and a deployed position corresponding to the nacelle operating in reverser-jet mode. The thrust reverser device includes a device for bleeding off some of a secondary or bypass airflow, which device is able to bleed off part of the secondary airflow from a duct through which the secondary airflow circulates and for conveying said bled-off airflow toward at least one pivot of the door, so as to cool areas on and/or around the door pivots.

17 Claims, 3 Drawing Sheets

(51) Int. Cl.
 *F02K 1/70* (2006.01)
 *F02K 1/76* (2006.01)

(52) U.S. Cl.
 CPC .... *F05D 2220/323* (2013.01); *F05D 2260/20* (2013.01); *F05D 2260/201* (2013.01); *F05D 2260/608* (2013.01); *Y02T 50/671* (2013.01); *Y02T 50/675* (2013.01)

(58) Field of Classification Search
 CPC .......... F02K 1/822; F02K 1/763; F02K 1/766; F01D 25/12; F05D 2260/605; F05D 2260/608
 See application file for complete search history.

(56) References Cited

U.S. PATENT DOCUMENTS

| | | | |
|---|---|---|---|
| 4,671,460 A | | 6/1987 | Kennedy et al. |
| 6,260,801 B1* | | 7/2001 | Peters ...................... F02K 1/60 239/265.29 |
| 6,487,845 B1* | | 12/2002 | Modglin ................... F02K 1/60 239/265.29 |
| 2007/0234707 A1* | | 10/2007 | Beardsley ................ F02K 1/72 60/226.2 |
| 2007/0261410 A1* | | 11/2007 | Frank ................... F01D 17/105 60/785 |

* cited by examiner

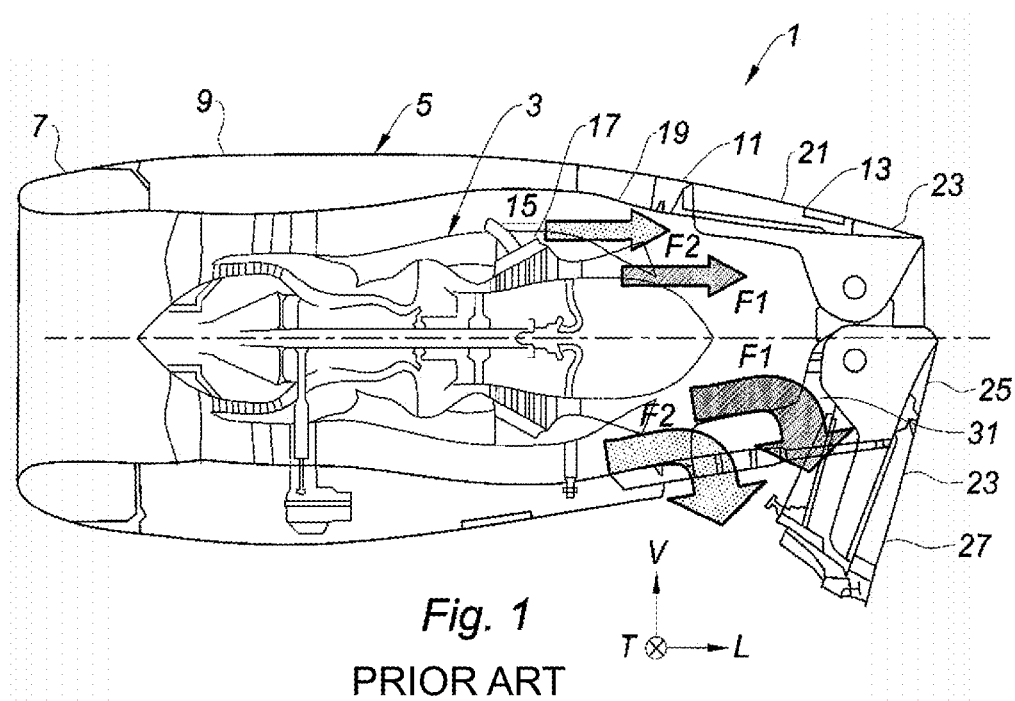
Fig. 1
PRIOR ART
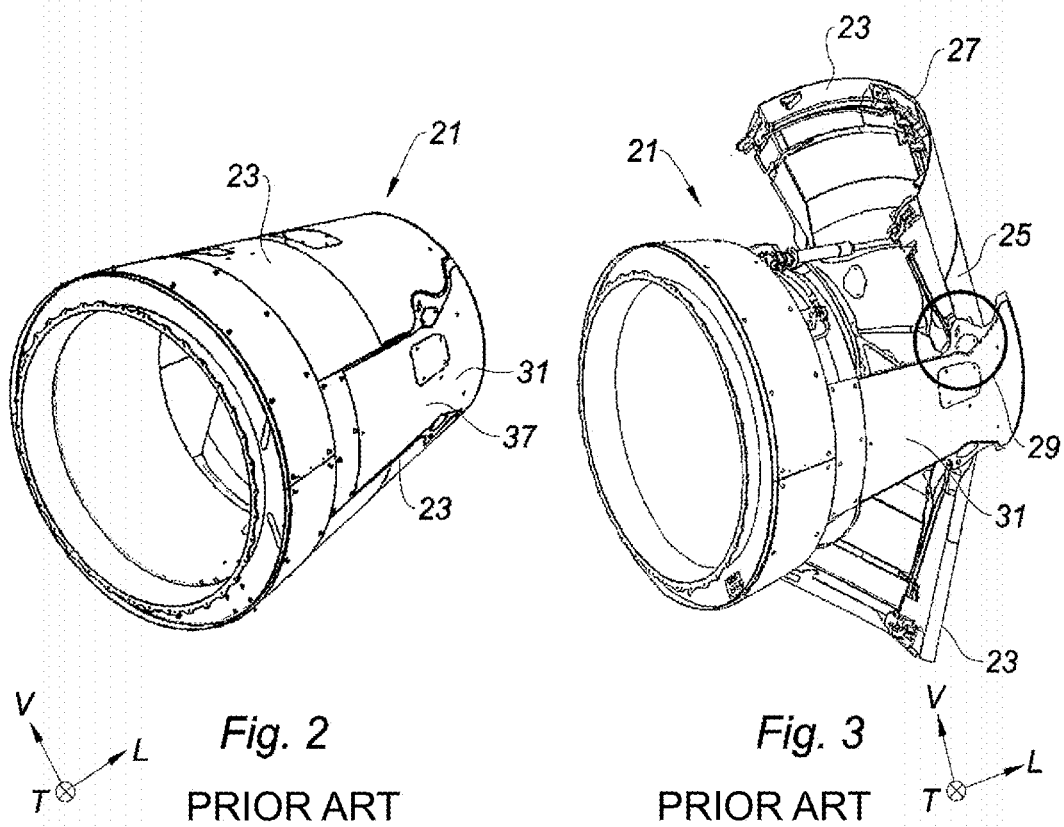
Fig. 2
PRIOR ART
Fig. 3
PRIOR ART

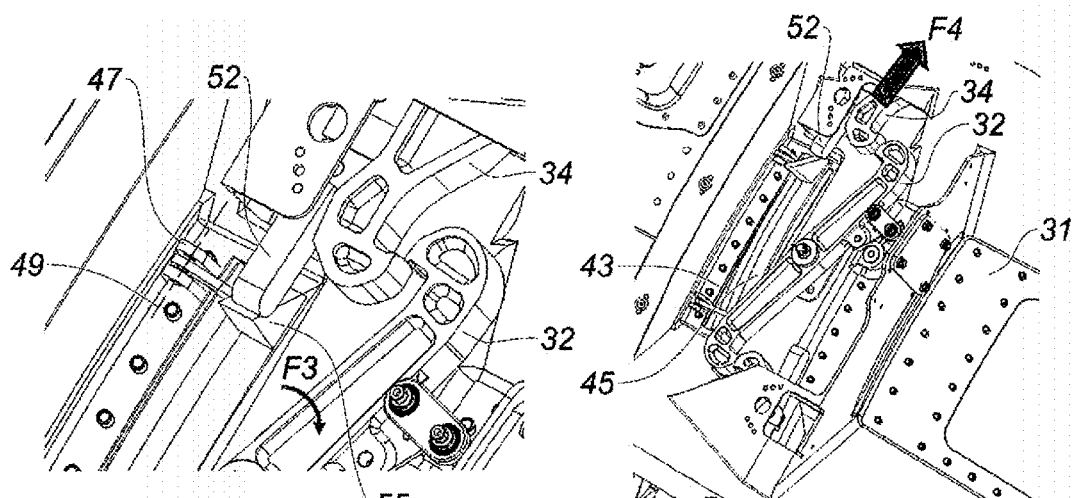
Fig. 6
Fig. 7
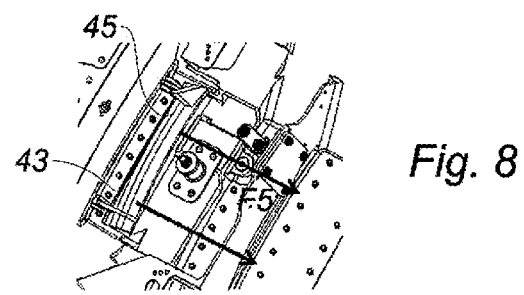
Fig. 8
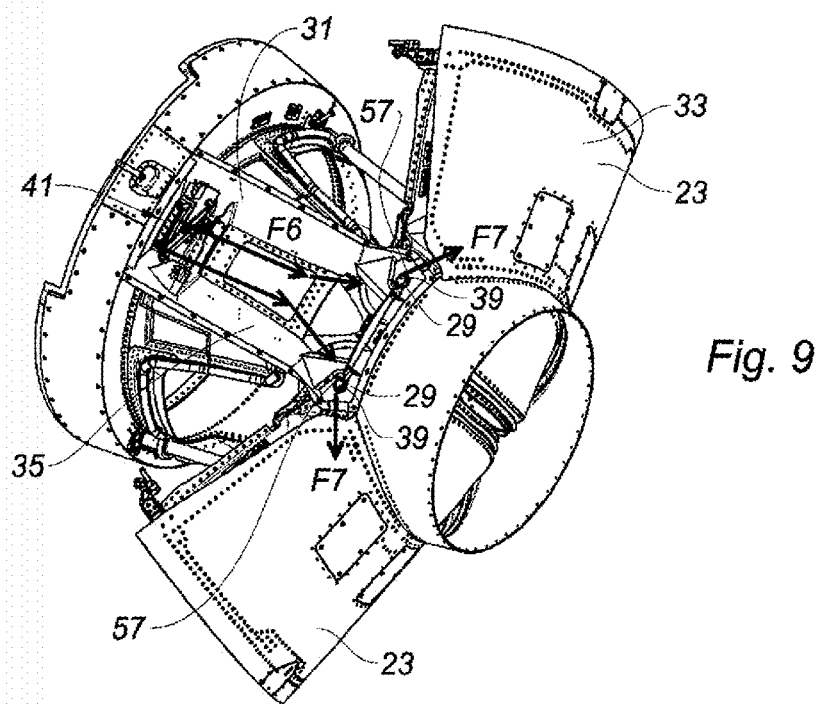
Fig. 9

DOOR-TYPE THRUST REVERSER DEVICE FOR AIRCRAFT TURBOJET ENGINE NACELLE

CROSS-REFERENCE TO RELATED APPLICATIONS

This application is a continuation of International Application No. PCT/FR2015/050733, filed on Mar. 24, 2015, which claims the benefit of FR 14/53106 filed on Apr. 8, 2014. The disclosures of the above applications are incorporated herein by reference.

FIELD

The present disclosure relates to a door-type thrust reverser, to a nacelle equipped with such a thrust reverser, and to a propulsion assembly comprising such a nacelle.

BACKGROUND

The statements in this section merely provide background information related to the present disclosure and may not constitute prior art.

An aircraft is propelled by one or several propulsion assemblies. Reference is made to FIG. 1 illustrating an example of a propulsion assembly according to the prior art. A propulsion assembly 1 comprises a turbojet engine 3 housed in a tubular nacelle 5. Each propulsion assembly is fastened to the aircraft by a mast, not represented, generally located under a wing or at the level of the fuselage.

A nacelle presents generally a substantially tubular structure comprising an upstream section 7 defining an air inlet, a mid-section 9 intended to surround a fan of the turbojet engine, a downstream section 11 capable of accommodating a thrust reverser device 13, and is generally terminated by an ejection nozzle the outlet of which is located downstream of the turbojet engine.

Modern nacelles are intended to accommodate a bypass turbojet engine capable of generating, by means of the gas generator, a hot air flow F1, called primary flow, and by means of the blades of the rotating fan, a cold air flow F2, called secondary flow, which circulates outside of the turbojet engine 3 through an annular channel defining a flow path of the secondary air flow 15.

The flow path 15 is delimited between an inner fairing 17 of the turbojet engine and an outer envelope 19 accommodating the thrust reverser device. The two air flows F1 and F2 are ejected from the turbojet engine 3 from the rear of the nacelle.

In the present application, the upstream and the downstream are defined with respect to the flow direction of air in the propulsion assembly in the direct jet operation, the air inlet being located upstream with respect to the ejection nozzle, located downstream of the nacelle.

The role of a thrust reverser during the landing of an aircraft is to improve the braking capability of an aircraft by redirecting forward at least one portion of the thrust generated by the turbojet engine. In this phase, the thrust reverser obstructs the gas ejection nozzle and directs the ejection flow of the engine forwardly of the nacelle, thereby generating a counter-thrust which is added to the braking of the wheels of the aircraft.

The means implemented to realize this reorientation of the flow vary depending on the thrust reverser type. However, in all cases, the structure of a thrust reverser comprises movable cowls displaceable between, on the one hand, a deployed position in which they open a passage in the nacelle intended to the diverted flow, and on the other hand, a retracted position in which they close this passage. Furthermore, these movable cowls may fulfill a diverting function or simply activate other diverting means.

In cascade-type thrust reversers, for example, the movable cowls slide along rails so that, when moving backwards during the opening phase, they uncover cascade vanes disposed in the thickness of the nacelle. A system of connecting rods connects this movable cowl to blocking doors which are deployed inside the ejection channel and block the direct flow outlet.

In door-type thrust reverser devices, such as the one which equips the nacelle represented in FIG. 1, each movable cowl pivots so as to block the flow and divert it and is therefore active in this reorientation.

More specifically, a door-type thrust reverser device 21 comprises several doors 23 pivotally mounted so as to be able to switch, under the action of drive means, between a retracted position corresponding to an operation of the nacelle in direct jet, position according to which the doors 23 provide, with a fixed structure 31 of the thrust reverser device, an aerodynamic continuity of the nacelle, position illustrated in FIG. 2, and a deployed position causing an operation of the nacelle in reverse jet, position illustrated in FIG. 3, position according to which the doors 23 have pivoted so that a downstream portion 25 of each door obstructs at least partially the flow path 15 of the secondary air flow F2, and that an upstream portion 27 opens, in the downstream section 11 of the nacelle, a passage 31 allowing the air flows F1 and F2 to be partially ejected from the nacelle, then redirected upstream of the nacelle by the deployed doors 23.

When a door is in the retracted position, corresponding to all the flight phases with the exception of the landing phase, the door is in contact with the cold air flow passing through the flow path of the secondary air flow.

When the door passes from its retracted position to its deployed position, a portion of the hot primary air flow passing through the turbojet engine enters into contact with the door.

The door then undergoes a temperature rise, in particular at the level of the pivots of the door and adjacent areas 29 of the pivots of the door. Such a temperature rise considerably weakens the rigidity of the nacelle at these areas.

In order to avoid such a structure weakening, the parts which compose the areas which surround the door pivots, and the door pivots themselves, are generally oversized, which considerably increases the mass of the nacelle.

In addition, these parts are generally made of materials capable of withstanding such high temperatures, such as polybismaleimide-type thermosetting resins, or still aluminum 2219, which are very expensive materials.

SUMMARY

The present disclosure provides a door-type thrust reverser device for an aircraft turbojet engine nacelle comprising:
  a fixed structure, and
  a structure movable relative to said fixed structure, comprising at least one door pivotally mounted by means of pivots between a retracted position corresponding to an operation of the nacelle in direct jet, and a deployed position corresponding to an operation of the nacelle in reverse jet, remarkable in that it comprises a device for collecting a portion of a secondary air flow, adapted to collect, when the thrust reverser is being deployed, a portion of the secondary air flow from an air path of the secondary air flow and to convey said collected air flow towards at least one pivot of the door, so as to cool the adjacent areas of the pivots of the door.

Thus, by providing such a device for collecting a portion of the secondary air flow, adapted to collect a portion of the cold air flow circulating in the secondary flow path of the nacelle, then to convey the collected air towards a pivot of the door, the pivots of the door are permanently cooled, regardless of the position of the door, whether retracted or deployed.

This advantageously allows avoiding the need to make the pivots of the door and the adjacent areas of these pivots in particularly heavy and expensive materials, which allows reducing both the mass of the nacelle and the manufacturing cost of door-type thrust reverser devices.

According to features, which are all optional, of the of the present disclosure:

- the fixed structure comprises an outer wall and an inner wall in contact with the flow path of the secondary air flow and said inner wall comprises at least one ventilation aperture enabling a communication between the flow path of the secondary air flow and a space for channeling the collected secondary air flow, defined between said inner and outer walls;
- the device for collecting a portion of the secondary air flow comprises at least one ventilation valve movable alternately between a closed position according to which it covers the ventilation aperture and an open position according to which it uncovers at least partially the ventilation aperture;
- the ventilation valve is pivotally mounted on an axis substantially parallel to an axis transverse to a longitudinal axis of the thrust reverser device;
- the device for collecting a portion of the secondary air flow comprises a device adapted to hold the ventilation valve in its closed position when the door is in the retracted position, and to enable the passage of said ventilation valve in its open position when said door is in the deployed position;
- said device adapted to hold the ventilation valve in its closed position when the door is in the retracted position, and to enable the passage of said ventilation valve in its open position when said door is in the deployed position, in one form comprises at least one ramp secured to said ventilation valve, cooperating with said door when said door is in the retracted position and being shaped to enable the passage of the ventilation valve from its closed position to its open position when the door passes from its retracted position to its deployed position;
- the door comprises a locking/unlocking device comprising at least one locking hook secured to said door, adapted to cooperate with a hook secured to the fixed structure of said thrust reverser device for a retracted position of said door, and the locking hook comprises a finger forming an extension supported by the ramp of the device for collecting a portion of the secondary air flow when the door is in the retracted position;
- the ventilation valve comprises an elastic device adapted to permanently urge said valve in its open position, which allows an easy opening of the valve during maintenance operations, by a simple opening operation of the door of the thrust reverser;
- the fixed structure of the thrust reverser device comprises at least one air outlet proximate to the door pivots shaped to evacuate at least one portion of the collected secondary air flow.

The present disclosure also relates to a nacelle for an aircraft turbojet engine remarkable in that it comprises at least one door-type thrust reverser device as described herein.

Finally, the present disclosure concerns a propulsion assembly for an aircraft comprising a turbojet engine housed in a nacelle, remarkable in that the device for collecting a portion of the secondary air flow is positioned upstream of an ejection plane of the primary air flow of the turbojet engine.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 illustrates a propulsion assembly comprising a nacelle equipped with a door-type thrust reverser device according to the prior art;

FIG. 2 represents an isometric view of the thrust reverser device of FIG. 1, represented in the direct jet operation position;

FIG. 3 is a view similar to that of FIG. 2, according to which the thrust reverser device is represented in the reverse jet operation position;

FIGS. 6 and 7 are enlarged perspective views representing the unlocking kinematics of the doors of the thrust reverser device according to the present disclosure;

FIG. 8 is an enlarged perspective view illustrating the conveying of the collected air flow in the secondary flow path according to the present disclosure; and FIG. 9 is a perspective view representing the thrust reverser device in the reverse jet operation position.

Figure 4:
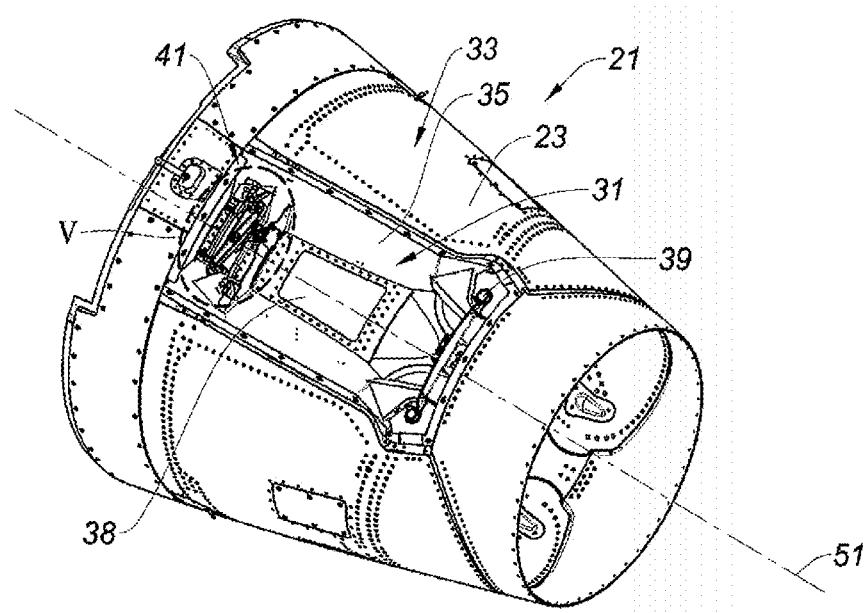
FIG. 4 is an isometric view of the thrust reverser device according to the present disclosure, represented in the direct jet operation position.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It is to be noted that in the description and in the claims, the terms "upstream" and "downstream" should be understood with reference to the circulation of the air flow inside the propulsion assembly formed by the nacelle and the turbojet engine, that is to say from the left to the right with reference to FIGS. 1 to 9.

Similarly, the expressions "inner" and "outer" will be used without limitation with reference to the radial distance relative to the longitudinal axis of the nacelle, the expression "inner" defining an area radially closer to the longitudinal axis of the nacelle, as opposed to the expression "outer."

Moreover, in the description and in the claims, in order to clarify the description and the claims, the terms longitudinal, vertical and transverse will be adopted without limitation with reference to the direct trihedron L, V, T indicated in the figures, the longitudinal axis L of which is parallel to the longitudinal axis 51 of the nacelle represented in FIG. 4.

Furthermore, in all figures, identical or similar reference numerals represent identical or similar members or sets of members.

Reference is made to FIG. 4, representing the door-type thrust reverser device 21 according to the present disclosure in the direct jet operation position.

The door-type thrust reverser device, hereinafter called "the thrust reverser," comprises a fixed structure 31 and a structure 33 movable relative to said fixed structure.

The fixed structure 31 is constituted by a beam of the thrust reverser, comprising an inner wall 35 in contact with the flow path 15 of the secondary air flow (visible in FIG. 1), and an outer wall 37 (hidden in FIG. 4, visible in FIG. 2) separated from the inner wall by a space 38.

In turn, the movable structure 33 comprises several doors 23, for example two, pivotally mounted by means of pivots 39 between a retracted position according to which they provide, with the fixed structure 31 of the thrust reverser, an external aerodynamic continuity of the nacelle, corresponding to an operation of the nacelle in direct jet, position represented in FIG. 4, and a deployed position according to which it creates a passage in the nacelle, corresponding to an operation of the nacelle in reverse jet, position represented in FIG. 9.

Holding the doors in the retracted position is achieved by means of an S-shaped hook 32 (visible in FIG. 5) mounted on the fixed structure 31 of the thrust reverser, cooperating at each of its ends with a locking hook 34 secured to each of the doors. The hook 32 is pivotally mounted, by means of an actuation means, so that pivoting of the hook 32 releases the locking hooks 34 of the doors, thereby enabling the passage of the doors from a retracted position to a deployed position.

As represented in FIG. 1, in the direct jet operation position, the cold air flow F2, generated by means of the blades of the rotating fan of the bypass turbojet engine housed in the nacelle, circulates in the annular channel defining the flow path 15 of the secondary air flow and is ejected downstream of the nacelle.

According to the present disclosure, the thrust reverser comprises a device 41 for collecting a portion of the secondary air flow, adapted to collect a portion of the secondary air flow from a flow path of the secondary air flow and to convey said collected air flow towards at least one pivot of the door.

The thrust reverser device may equip a nacelle supporting a bypass turbojet engine, and the device for collecting a portion of the secondary air flow is positioned upstream of an ejection plane of the primary air flow of the turbojet engine, which allows collecting only the cold air, not mixed with the hot primary air flow coming from the turbojet engine.

Figure 5:
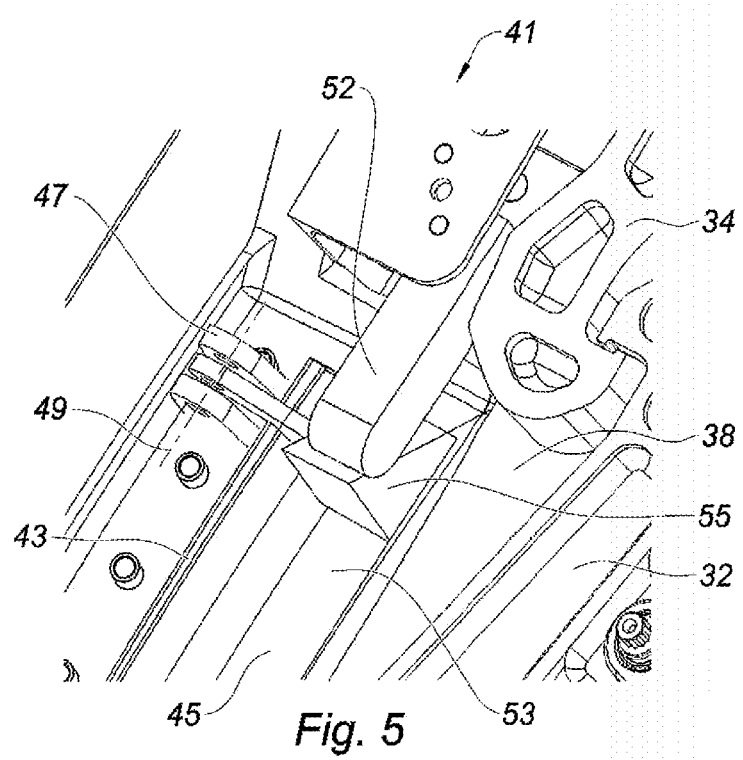
FIG. 5 is an enlarged perspective view representing a device for collecting a portion of the secondary air flow according to the present disclosure.

Reference is made to FIG. 5, illustrating an enlargement of the area V of FIG. 4.

According to the present disclosure, the inner wall 35 comprises, for each of the beams of the fixed structure of the thrust reverser, at least one ventilation aperture 43 forming a communication between the flow path of the secondary air flow and the space 38 for conveying the collected secondary air flow.

The ventilation aperture 43 may be obturated by a ventilation valve 45 pivotally mounted by means of a hinge 47 about an axis 49 substantially parallel to an axis transverse to a longitudinal axis 51 of the thrust reverser, represented in FIG. 4.

The locking hook 34 of the door is secured to a finger 52 forming an extension of the locking hook.

The finger 52 is supported, when the door is in the retracted position represented in FIG. 5, by a ramp 55 secured to the outer wall 53 of the ventilation valve 45.

The operation of the device 41 for collecting a portion of the secondary air flow will now be described.

When the door is in the retracted position, position represented in FIG. 5, the ramp 55, secured to the ventilation valve 45, cooperates with the door of the thrust reverser by means of the finger 52, thereby holding the ventilation valve 45 in a closed position according to which it obturates the ventilation aperture 43.

At this level, the secondary air flow circulating in the secondary flow path passes through the flow path and is ejected conventionally downstream of the nacelle.

When the operation of the nacelle in reverse jet is controlled, the S-shaped hook 32 pivots about an axis parallel to a substantially vertical axis of the thrust reverser, which releases the locking hook 34 of the door, as represented in FIGS. 6 to 8 to which reference is now made.

When the S-shaped hook 32 pivots according to the arrow F3 represented in FIG. 6, the locking hook 34 secured to the door is unlocked, which causes the passage of the door from its retracted position to its deployed position, according to the arrow F4 represented in FIG. 7.

When the door is displaced towards its deployed position, the finger 52 secured to the hook 34 is displaced along the ramp 55, thereby releasing the ventilation valve 45.

The ventilation valve, in permanent contact with the secondary air flow flowing in the secondary flow path, pivots about the axis 49 of the hinge 47, in the direction of the space 38 contained between the inner and outer walls of the fixed structure of the thrust reverser under the effect of the pressure generated by the secondary air flow.

The ventilation valve 45 passes then from its closed position to its open position, thereby uncovering the ventilation aperture 43.

Alternatively, an elastic device such as a torsion spring may be mounted on the pivot axis of the ventilation valve so as to permanently urge the valve in its open position, which allows an easy opening of the valve during maintenance operations, by a simple opening operation of the door of the thrust reverser.

When the ventilation valve is in its open position, the secondary air flow flowing in the secondary flow path then passes through the ventilation aperture 43, as represented by the arrow F5 represented in FIG. 8.

Afterwards, the air flow collected from the secondary flow path is conveyed along the inner wall 35 according to the arrow F6 of FIG. 9, towards the pivots 39 of the doors 23, thereby allowing cooling off the pivots 39 and the adjacent areas 29 of the pivots.

The adjacent areas 29 of the pivots comprise air outlets 57 shaped to evacuate at least partially the collected secondary air flow, according to the arrows F7.

Thus, thanks to the present disclosure, the mass of the nacelle and the manufacturing cost of the door-type thrust reverser devices are considerably reduced in that heavy door pivots made of materials capable of withstanding the significant temperatures generated by the primary air flow coming from the turbojet engine can be avoided.

It goes without saying that the present disclosure is not limited to the sole forms of the thrust reverser device, of the nacelle and of the propulsion assembly, described hereinabove only as illustrative examples, but it encompasses on the contrary all variants involving technical equivalents of the described means as well as their combinations if these fall within the scope of the present disclosure.

What is claimed is:

1. A door-type thrust reverser device for a nacelle of an aircraft turbojet engine which comprises a bypass duct and a primary air path through a core of the turbojet engine, the door-type thrust reverser device comprising:
    a fixed structure;
    a structure movable relative to said fixed structure comprising at least one door pivotally mounted by pivots between a retracted position corresponding to an operation of the nacelle in direct jet, and a deployed position corresponding to an operation of the nacelle in reverse jet, wherein the at least one door is configured to divert hot primary air flow from the primary air path when in the deployed position; and
    a collector defining a pathway that is separate from the diverted hot primary air flow, the collector configured to collect a portion of a secondary air flow from the bypass duct and to convey said portion of the secondary air flow along the pathway towards at least one of the pivots of the at least one door, so as to cool adjacent areas of the pivots of the at least one door;
    wherein the fixed structure comprises an outer wall and an inner wall in contact with a flow path of the secondary air flow, wherein said inner wall comprises at least one ventilation aperture providing communication between the flow path of the secondary air flow and the pathway for conveying the portion of the secondary air flow, the pathway defined between said inner and outer walls; and
    wherein the collector comprises at least one ventilation valve movable alternately between a closed position in which the at least one ventilation valve covers the at least one ventilation aperture and an open position in which the at least one ventilation valve uncovers at least partially the at least one ventilation aperture.

2. The door-type thrust reverser device according to claim 1, wherein the at least one ventilation valve is pivotally mounted relative to an axis substantially parallel to an axis transverse to a longitudinal axis of the door-type thrust reverser device.

3. The door-type thrust reverser device according to claim 1, wherein the collector is adapted to hold the at least one ventilation valve in its closed position when the at least one door is in the retracted position, and to enable passage of said at least one ventilation valve in its open position when said at least one door is in the deployed position.

4. The door-type thrust reverser device according to claim 3, wherein the thrust reverser device is adapted to hold the at least one ventilation valve in its closed position when the at least one door is in the retracted position and enables passage of said at least one ventilation valve to its open position when said at least one door is in the deployed position, further comprising at least one ramp secured to said at least one ventilation valve and cooperating with said at least one door when said at least one door is in the retracted position and being shaped to enable passage of said at least one ventilation valve from its closed position to its open position when the at least one door passes from its retracted position to its deployed position.

5. The door-type thrust reverser device according to claim 4, wherein the at least one door comprises a locking/unlocking device comprising at least one first hook secured to said at least one door, the locking/unlocking device adapted to cooperate with at least one second hook secured to the fixed structure of said thrust reverser device in the retracted position of said at least one door, wherein the at least one first hook comprises a finger forming an extension supported by the at least one ramp of the collector when the at least one door is in the retracted position.

6. The door-type thrust reverser device according to claim 1, wherein the at least one ventilation valve comprises an elastic device adapted to permanently urge said at least one ventilation valve in said open position.

7. The door-type thrust reverser device according to claim 1, wherein the fixed structure comprises at least one air outlet proximate to the pivots and shaped to evacuate at least some of said portion of the secondary air flow.

8. A nacelle for an aircraft turbojet engine comprising at least one door-type thrust reverser device according to claim 1.

9. A propulsion assembly for an aircraft comprising a turbojet engine housed in the nacelle according to claim 8, wherein the collector is positioned upstream of an ejection plane of the primary air path of the turbojet engine.

10. A door-type thrust reverser device for a nacelle of an aircraft turbojet engine which comprises a bypass duct and a primary air path through a core of the turbojet engine, the door-type thrust reverser device comprising:
    a fixed structure;
    a structure movable relative to said fixed structure comprising at least one door pivotally mounted by pivots between a retracted position corresponding to an operation of the nacelle in direct jet, and a deployed position corresponding to an operation of the nacelle in reverse jet, wherein the at least one door is configured to define a thrust reverser opening and block at least a portion of the primary air path to divert hot primary air flow from the primary air path when in the deployed position; and
    a collector configured to collect a portion of a secondary air flow from the bypass duct and to convey said portion of the secondary air flow towards at least one of the pivots of the at least one door, so as to cool adjacent areas of the pivots of the at least one door;
    wherein the fixed structure comprises an outer wall and an inner wall in contact with a flow path of the secondary air flow, wherein said inner wall comprises at least one ventilation aperture providing communication between the flow path of the secondary air flow and a space for conveying the portion of the secondary air flow, defined between said inner and outer walls.

11. The door-type thrust reverser device according to claim 10, wherein the collector comprises at least one ventilation valve movable alternately between a closed position in which the at least one ventilation valve covers the at least one ventilation aperture and an open position in which the at least one ventilation valve uncovers at least partially the at least one ventilation aperture.

12. The door-type thrust reverser device according to claim 11, wherein the at least one ventilation valve is pivotally mounted relative to an axis substantially parallel to an axis transverse to a longitudinal axis of the door-type thrust reverser device.

13. The door-type thrust reverser device according to claim 11, wherein the collector is adapted to hold the at least one ventilation valve in its closed position when the at least one door is in the retracted position, and to enable passage of said at least one ventilation valve in its open position when said at least one door is in the deployed position.

14. The door-type thrust reverser device according to claim 13, wherein the thrust reverser device is adapted to hold the at least one ventilation valve in its closed position when the at least one door is in the retracted position and enables passage of said at least one ventilation valve to its open position when said at least one door is in the deployed position, further comprising at least one ramp secured to said at least one ventilation valve and cooperating with said at least one door when said at least one door is in the retracted position and being shaped to enable passage of said at least one ventilation valve from its closed position to its open position when the at least one door passes from its retracted position to its deployed position.

15. The door-type thrust reverser device according to claim 14, wherein the at least one door comprises a locking/unlocking device comprising at least one first hook secured to said at least one door, the locking/unlocking device adapted to cooperate with at least one second hook secured to the fixed structure of said thrust reverser device in the retracted position of said at least one door, wherein the at least one first hook comprises a finger forming an extension supported by the at least one ramp of the collector when the at least one door is in the retracted position.

16. The door-type thrust reverser device according to claim 11, wherein the at least one ventilation valve comprises an elastic device adapted to permanently urge said at least one ventilation valve in said open position.

17. The door-type thrust reverser device according to claim 10, wherein the fixed structure comprises at least one air outlet proximate to the pivots and shaped to evacuate at least some of said portion of the secondary air flow.

* * * * *